United States Patent [19]

Bradshaw

[11] Patent Number: 4,831,765

[45] Date of Patent: May 23, 1989

[54] FISHING LURE OR DECOY DEVICE INCLUDING HOLOGRAPHIC IMAGE

[76] Inventor: Roy Bradshaw, 9 Shenandoah Way, Pacifica, Calif. 94044

[21] Appl. No.: 872,251

[22] Filed: Jun. 9, 1986

[51] Int. Cl.[4] ............................................. A01K 85/00
[52] U.S. Cl. ...................................... 43/42.32; 43/17.6
[58] Field of Search ................ 43/42.32, 42.33, 42.34, 43/17.6, 2; 283/86, 85, 904; 350/3.6

[56] References Cited

U.S. PATENT DOCUMENTS

| | | | |
|---|---|---|---|
| 2,624,147 | 1/1953 | Round | 43/42.34 |
| 2,694,877 | 11/1954 | Wise | 43/42.33 |
| 3,021,636 | 2/1962 | Gowdy | 43/42.34 |
| 3,413,750 | 12/1968 | Henry | 43/42.33 |
| 3,940,868 | 3/1976 | Northcutt | 43/17.6 |
| 4,176,490 | 12/1979 | Philips | 43/42.33 |
| 4,199,888 | 4/1980 | Barnes | 43/42.34 |
| 4,451,068 | 5/1984 | Hall | 383/904 |
| 4,573,711 | 3/1986 | Hyde | 383/904 |

Primary Examiner—Gene P. Crosby
Attorney, Agent, or Firm—John A. Bucher

[57] ABSTRACT

Various embodiments of fishing lures, decoy devices and the like are disclosed for trapping, snaring, catching or attracting fish, game or the like in their natural environment. The lure or decoy device includes a body portion with a holographic image formed on or applied to the body means to make the lure or decoy more life-like and attractive to the fish or game in its natural environment. The lure can be of various configurations including planar, three-dimensional or with offset surfaces to which the holographic image is applied. The holographic image can be formed as a multiplexed image or by means of other holographic variations to further enhance its life-like appearance. A light source can also be employed to similarly enhance the life-like appearance of the holographic image.

9 Claims, 2 Drawing Sheets

FISHING LURE OR DECOY DEVICE INCLUDING HOLOGRAPHIC IMAGE

FIELD OF THE INVENTION

The present invention relates to lures, decoys and the like for trapping, snaring, catching or attracting fish, game and the like.

BACKGROUND OF THE INVENTION

Numerous devices have been disclosed in the prior art for trapping, snaring or catching fish, game and the like. In particular, a wide variety of such devices have been disclosed in the form of fishing lures which are adapted for attachment to fishing lines and include hooks or means for attaching hooks. The lures are intended to be attractive to fish in their natural underwater environment to facilitate catching of the fish.

Fishing lures have commonly been formed as planar devices or with three-dimensional configurations intended, for example, to resemble different bait which are naturally appealing to the fish. The lures can be painted or formed with reflective surfaces either to more closely resemble the intended bait or for the purpose of attracting the attention of the fish.

Certain variations of fishing lures have included illuminating means to make the devices even more attractive to fish in their natural underwater environment.

A wide variety of decoy devices is contemplated by the present invention and the preceding description is merely intended to be exemplary and not inclusive as to the scope of the invention.

In any event, there has been found to remain a need for improved lures or decoys for providing a more life-like appearance which is more attractive to fish or game.

SUMMARY OF THE INVENTION

It is therefore an object of the invention to provide a fishing lure or decoy device for trapping, snaring, catching or attracting fish, game and the like, the lure or decoy device including a holographic image for forming a more life-like representation which is particularly attractive to the fish or game in its natural environment.

It is also an object of the invention to provide such a lure or decoy including means for trapping, snaring or catching the fish or game.

It is a further object of the invention to provide such a lure or decoy device which is three-dimensional and/or which includes relatively offset surfaces, the holographic image being applied to the three-dimensional shape or relatively offset surfaces to further enhance life-like appearance of the lure or decoy.

It is a still further object of the invention to provide such a lure or decoy wherein the holographic image is multiplexed for further enhancing life-like appearance of the lure or decoy device.

Within all of the embodiments of the invention as summarized above, the holographic image, whether being multiplexed or not, may be formed as a decal which can then be applied to a body portion of the lure or decoy device or integrally formed upon one or more surfaces of the lure or decoy device.

It is yet a further object of the invention to provide such a lure or decoy device further comprising a light source or illuminating the holographic image to further enhance its life-like appearance. The light source may be internally arranged within the body portion of the lure or decoy device or externally mounted and directed toward the holographic image.

In the context of the present invention, the term "lure" is intended to cover a wide variety of devices employed for catching fish. Similarly, the term "decoy" is intended to refer to a wide variety of devices, contemplated for trapping, snaring, catching or attracting a variety of fish, game and the like. In particular, decoy devices as contemplated by the present invention are commonly employed for attracting various types of game, particularly birds or fowl such as ducks, geese and the like.

Where the device is a lure, it includes means for trapping, snaring, catching the fish or game. Lures commonly include hooks for catching fish.

In some applications of the present invention, it may be merely intended for the decoy device to attract the fish or game without actually trapping, snaring or catching them. As an example, decoys or ducks, geese and other fowl are commonly used merely for attracting the fowl. In such applications, the decoys may be arranged in the water, on trees or in other natural environments for attracting the desired game.

Also in the context of the invention, the term "decoy" and the term "attract" are also intended in a negative sense. Thus, the invention is also intended to include scarecrows and the like which are similarly provided with a life-like appearance for the purpose of repelling animals, birds or the like.

Additional objects and advantages of the invention are made apparent in the following description having reference to the accompanying drawings.

DESCRIPTION OF THE PREFERRED EMBODIMENTS

Figure 1:
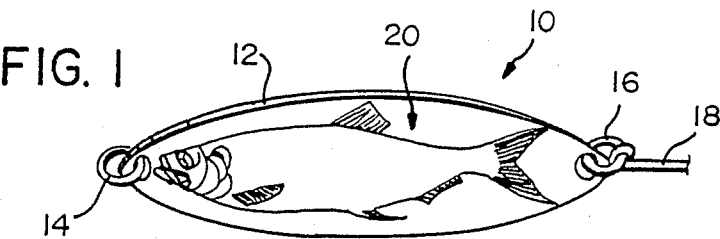
FIG. 1 is a representation of a fishing lure having a generally planar body with a holographic image of a fish imposed upon a surface of the body as bait for attracting fish in their natural underwater environment.

Referring now to the drawings in general, the present invention is directed toward fishing lures or decoy devices contemplated for trapping, snaring or catching fish, game or the like, usually within their natural environment. For example, fishing lures are intended for underwater use while decoy devices of the type contemplated by the present invention may be used for example on the surface of water or in marshy areas to attract fowl such as ducks or geese. Similarly, decoy devices may be arranged in any other natural habitats such as in the branches of trees, in grassy areas or any other natural environment for the purpose of trapping, snaring or catching various types of game.

Generally, the embodiments of the invention illustrated in the various drawings are directed toward fishing lures. However, it will be obvious that similar devices may be employed as decoys in any of the environments referred to above for attracting various types of game. Accordingly, the various components referred to above for the specific fishing lures illustrated in FIGS. 1-8 can also be employed in various decoy devices for attracting a wide variety of game.

Referring now to FIG. 1, a fishing lure is generally indicated at 10 and includes a body portion 12 having a generally planar configuration with an eyelet 14 formed at a forward end of the body 12 for attachment to a fishing line (not shown) and a similar eyelet 16 arranged at the rearward end of the body 12 for attachment of a hook as partially represented at 18.

The body 12 may be formed for example from a shiny metal or other material for initially attracting the attention of fish. In addition, a holographic image 20 is applied to the body 12. This halographic image is of a fish including its eye. As illustrated in FIG. 1, such a holographic image is applied to one side of the body 12. However, it will be obvious that a similar holographic image could be applied to the opposite side of the body 12 as well to make it even more effective.

The holographic image 20 represents a fish or other type of bait selected for attracting fish toward the lure. The bait represented by the holographic image may be either a small bait fish as illustrated in FIG. 1 or a wide variety of other types of bait selected for attracting the fish. Note in particular FIG. 6 wherein the bait is an insect. However, for the purpose of forming lures or decoy devices for attracting fish or game, the holographic image may represent any portion of a natural environment which is meant to be attractive to the fish or game and to draw them closer for the purpose of trapping, snaring or catching them. For example, with the decoy being an underwater trap, the holographic image could be a representation of grass or other vegetation or the like intended to be attractive to the fish or game being sought.

In any event, the holographic image of the present invention is intended to form a life-like representation which, because of movement inherent from the holographic image, tends to create a more life-like appearance which is particularly attractive to the fish or game.

Figure 2:
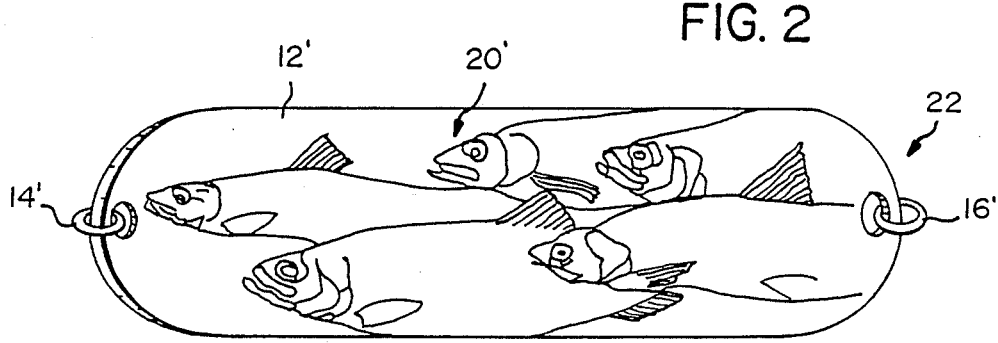
FIG. 2 is a representation of a similar fishing lure having a holographic image representing a school of fish for a similar purpose.

Referring now to FIG. 2, another fishing lure is generally indicated at 22 with similar components indicated by primed numerals corresponding to those described above for FIG. 1. However, the holographic image 20' in FIG. 2 represents a school of fish which otherwise has all of the advantages summarized above for the purpose of attracting fish in their natural underwater environment.

Figure 3:
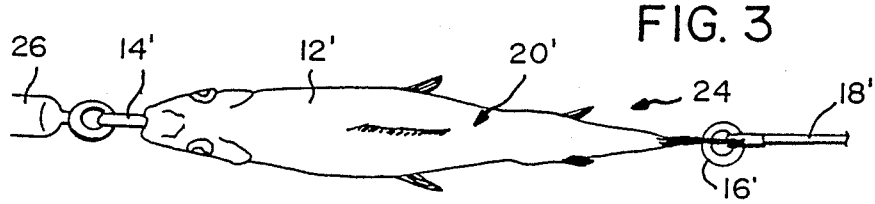
FIGS. 3 and 4 are top views and side views respectively of a fishing lure having a body portion formed in the three-dimensional shape of a fish selected as a bait.
Figure 4:
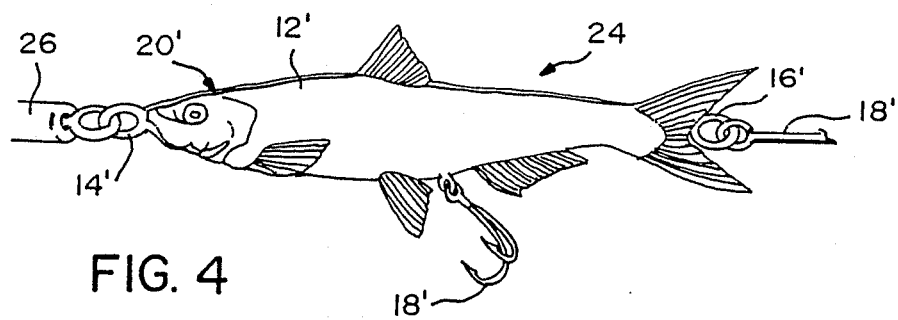

In FIGS. 3 and 4, yet another embodiment of a fishing lure is indicated at 24 including similar components again represented by primed numerals. In FIGS. 3 and 4, the body 12 of the fishing lure is three-dimensional as may be clearly seen by combined references to the two figures. At the same time, a holographic image 20' is formed on the outer surface of the body 12' to provide a lifelike representation in the same manner summarized above. In the embodiment of FIGS. 3 and 4, the holographic image may be even more life-like in the natural underwater environment of fish because of its three-dimensional configuration. Also, the fishing lure 24 of FIGS. 3 and 4 is illustrated with a leader 26 for attaching the lure to a fishing line (not shown). Also, the fishing lure 24 of FIGS. 3 and 4 is shown with multiple hooks 18'.

Figure 5:
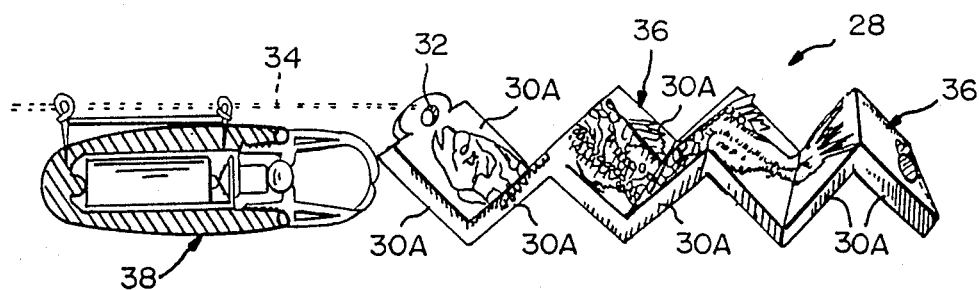
FIG. 5 is a representation of a fishing lure with a body portion formed from a generally planar configuration but then bent or angled to form relatively offset surfaces to which the holographic image is applied, the fishing lure of FIG. 5 also including an external light source.

Referring now to FIG. 5, another embodiment 28 of a fishing lure is illustrated with a body 30 having an eyelet 32 adapted for attaching the lure to a fishing line 34. The body 30 is formed as a generally planar piece while being bent or angled to form relatively offset portions 30A. A holographic image 36 is applied to the offset surfaces 30A so that the various portions of the holographic image 36 formed on the angularly arranged portions 30A react differently to underwater light to create a life-like representation which can be even more attractive to fish in their natural underwater environment.

To further enhance the life-like appearance of the holographic image 36 on the fishing lure 28, an external light source 38 is preferably suspended upon the fishing line 34 while being directed generally toward the holographic image 36 to even further enhance its life-like appearance and make the lure even more attractive to the fish in their natural underwater environment.

Figure 6:
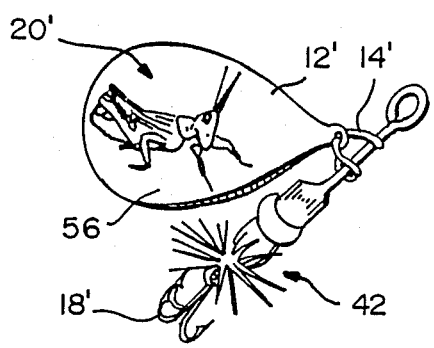
FIG. 6 is a representation of yet another fishing lure similar to those illustrated in FIGS. 1 and 2 with a holographic image or representation of an insect selected as bait for fish in their natural underwater environment.

As noted above, FIG. 6 represents yet another embodiment 40 of a fishing lure having components indicated by primed numerals similar to those described above for FIGS. 1 and 2. However, in FIG. 6, the holographic image 20' is a form of bait such as an insect different from that illustrated in FIG. 1. Otherwise, the fishing lure of FIG. 6 is similarly intended to provide a lifelike representation of bait for attracting fish in their natural underwater environment. In the embodiment 40 of FIG. 6, the hook 18' is attached directly to the forward eye 14' of the lure with various flasher means 42 or the like being intended to further attract fish.

Figure 7:
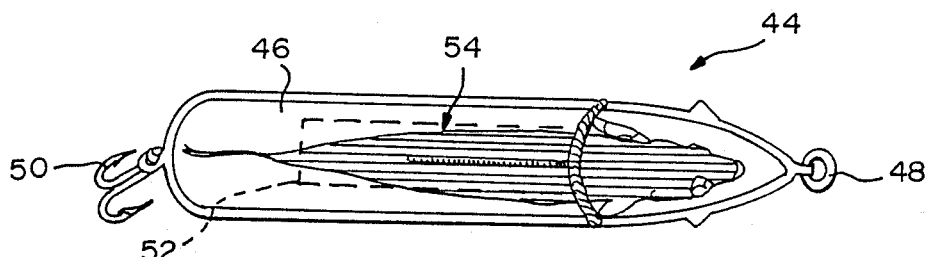
FIGS. 7 and 8 are respectively a top view and side view of a fishing lure having a three-dimensional body with a holographic image being applied thereto and with internal illumination arranged within the body.
Figure 8:
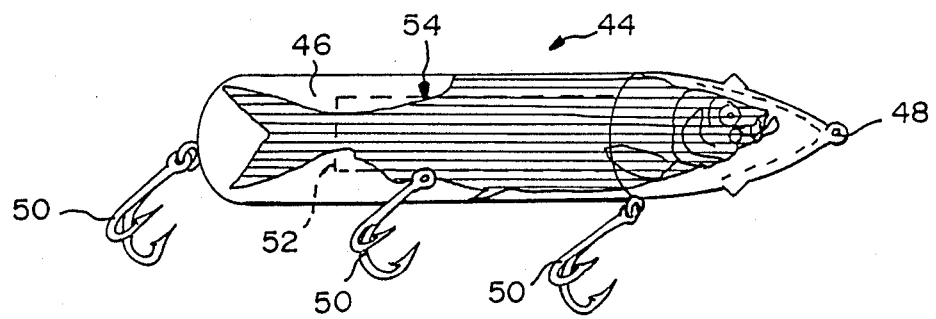

Yet another embodiment of a fishing lure is represented at 44 in FIGS. 7 and 8. As in the embodiment of FIGS. 3 and 4, the lure 44 includes a three-dimensional body 46 with an eyelet 48 for attaching the lure to a fishing line (not shown) and multiple hooks 50 attached to the body 46. The body 46 is of two-part construction in order to permit insertion of an internal illumination device 52 which functions in a manner described immediately below.

A holographic image 54 is applied to or formed upon the body 46. However, in the embodiment of FIGS. 7 and 8, the holographic image is formed as a multiplexed image produced by a multiplexing process which is believed well known to those skilled in the holographic art. Very briefly, the multiplexing process involves formation of different holographic images arranged about the body 46 to produce an even more life-like appearance for the lure from any direction about the circumference of the body. Thus, the fishing lure 44 of FIGS. 7 and 8 represents a type of variation which can also be employed in the other embodiments described above.

In addition to a multiplexed image, the holographic image may be produced according to other techniques well known to those skilled in the holographic art for making the lures or decoy devices of the present invention even more life-like. For example, the holographic image may be formed by a photochromic process or on potassium dichromate as other variations for producing life-like representations. Here again, these variations of holographic techniques are set forth herein only for purposes of demonstrating possible variations for the lure or decoy device of the invention without limiting the specific types of holographic images which can be employed.

The internal illuminating device 52 is arranged within the body 46 so that it illuminates the multiplexed holographic image 54 for similar reasons of further enhancing life-like appearance of the lure.

Referring again to FIG. 6, the holographic image 20' is embossed on a transfer decal 56 which is applied to the body 12'.

There has been descirbed above a number of embodiments representing numerous features within lures or decoys and the like for the purpose of trapping, snaring, catching, or merely attracting fish, game and the like. Numerous variations and modifications are believed obvious in addition to those described above. In particular, it is again noted that the invention encompasses a wide variety of decoy devices including similar features such as those described above on fishing lures. Accordingly, the scope of the present invention is defined only by the following appended claims.

What is claimed is:

1. A fishing lure comprising body means forming a portion of the lure, means formed on the body means for attachment to a fishing line, means for effectively attaching a fishing hook to the lure, and a holographic image of a fish including its eye formed on the body means to make the lure more life-like due to the presence of said holographic fish image including its eye which increases a range of viewing angles and makes the lure more attractive to fish in an underwater environment.

2. The fishing lure of claim 1 wherein the body means is three-dimensional.

3. The fishing lure of claim 1 wherein the three-dimensional body means includes relatively offset surfaces, the holographic image being applied to the offset surfaces to further enhance lifelike appearance of the fishing lure.

4. The fishing lure of claim 1 wherein the holographic image is a multiplexed image to further enhance life-like appearance of the fishing lure.

5. The fishing lure of claim 1 wherein the holographic image is a decal applied to the body means.

6. The fishing lure of claim 1 wherein the body means includes relatively offset surfaces, the holographic image being applied to the offset surfaces to further enhance life-like appearance of the fishing lure.

7. The fishing lure of claim 1 further comprising a light source for illuminating the holographic image to further enhance life-like appearance of the fishing lure.

8. The fishing lure of claim 1 further comprising a light source for illuminating the holographic image to further enhance lifelike appearance of the fishing lure.

9. The fishing lure of claim 1 wherein the light source is arranged externally of the body means and directed toward the holographic image.

* * * * *